United States Patent
Murata et al.

(10) Patent No.: US 9,848,092 B2
(45) Date of Patent: Dec. 19, 2017

(54) IMAGE READING DEVICE DETERMINING WHETHER OR NOT HOLE OF ORIGINAL DOCUMENT IS TO TRAVEL ON EDGE OF CONVEYANCE ROLLER

(71) Applicant: KYOCERA Document Solutions Inc., Osaka (JP)

(72) Inventors: Takuro Murata, Osaka (JP); Shinya Matsui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/173,207

(22) Filed: Jun. 3, 2016

(65) Prior Publication Data

US 2016/0366287 A1 Dec. 15, 2016

(30) Foreign Application Priority Data

Jun. 12, 2015 (JP) ................. 2015-119203

(51) Int. Cl.
H04N 1/00 (2006.01)

(52) U.S. Cl.
CPC ..... *H04N 1/00013* (2013.01); *H04N 1/00015* (2013.01); *H04N 1/00034* (2013.01); *H04N 1/00037* (2013.01); *H04N 1/00082* (2013.01); *H04N 1/00411* (2013.01); *H04N 2201/0081* (2013.01); *H04N 2201/0094* (2013.01)

(58) Field of Classification Search
USPC ................ 358/1.1–3.29, 1.11–1.18, 448–462
See application file for complete search history.

(56) References Cited

U.S. PATENT DOCUMENTS

| | | | | |
|---|---|---|---|---|
| 2002/0079640 A1* | 6/2002 | Yoshie | ................. | B26D 7/2628 271/176 |
| 2003/0156872 A1* | 8/2003 | Hirai | ................. | B26D 7/24 399/407 |
| 2005/0128516 A1* | 6/2005 | Tomita | ................ | H04N 1/00355 358/1.15 |
| 2014/0146362 A1* | 5/2014 | Eguchi | ............... | H04N 1/00411 358/1.15 |
| 2015/0283722 A1* | 10/2015 | Isogai | ....................... | B26F 1/02 83/30 |

FOREIGN PATENT DOCUMENTS

JP 2003-198777 A 7/2003

* cited by examiner

*Primary Examiner* — Marcellus Augustin
(74) *Attorney, Agent, or Firm* — Studebaker & Brackett PC

(57) ABSTRACT

An image reading device reads an image of an original document and includes a conveyance roller, an image reading section, a first determination section, a second determination section, and a conveyance stopping section. The conveyance roller conveys the original document. The image reading section reads the image of the original document. The first determination section determines whether or not the original document has a punched hole based on the image read by the image reading section. The second determination section determines, upon determination that the original document has the punched hole, whether or not the punched hole is to travel on an edge of the conveyance roller. The conveyance stopping section stops conveyance of the original document upon determination that the punched hole is to travel on the edge of the conveyance roller.

12 Claims, 7 Drawing Sheets

IMAGE READING DEVICE DETERMINING WHETHER OR NOT HOLE OF ORIGINAL DOCUMENT IS TO TRAVEL ON EDGE OF CONVEYANCE ROLLER

INCORPORATION BY REFERENCE

The present application claims priority under 35 U.S.C. §119 to Japanese Patent Application No. 2015-119203, filed on Jun. 12, 2015. The contents of this application are incorporated herein by reference in their entirety.

BACKGROUND

The present disclosure relates to image reading devices and image forming apparatuses.

An image reading device that reads an image formed on an original document is generally known. A technique to perform, in an image reading device, certain processing relating to punched holes is also known.

A known image reading device for example performs blank paper detection while excluding a region having punched holes. The image reading device excludes a rectangular region of an original document having punched holes, if any, from a target region of the blank paper detection. The rectangular region includes a region having the punched holes. If a total number of pixels within the target region of the blank paper detection that are counted with respect to a density range of zero to a specified density is greater than a threshold, the original document detected is determined to be blank paper.

This image reading device can reduce false detection of blank paper by excluding the region of the original document having punched holes from the target region of the blank paper detection.

SUMMARY

An image reading device according to a first aspect of the present disclosure reads an image of an original document and includes a conveyance roller, an image reading section, a first determination section, a second determination section, and a conveyance stopping section. The conveyance roller conveys the original document. The image reading section reads the image of the original document. The first determination section determines whether or not the original document has a hole based on the image read by the image reading section. The second determination section determines, upon determination that the original document has the hole, whether or not the hole is to travel on an edge of the conveyance roller. The conveyance stopping section stops conveyance of the original document upon determination that the hole is to travel on the edge of the conveyance roller.

An image forming apparatus according to a second aspect of the present disclosure includes the above-described image reading device and an image forming section. The image forming section forms an image on a recording medium.

BRIEF DESCRIPTION OF THE DRAWINGS

FIG. 4A is a plan view of paper having punched holes.

FIG. 4B illustrates conditions to be satisfied for a punched hole to travel on an edge of the conveyance roller.

DETAILED DESCRIPTION

Figure 1:
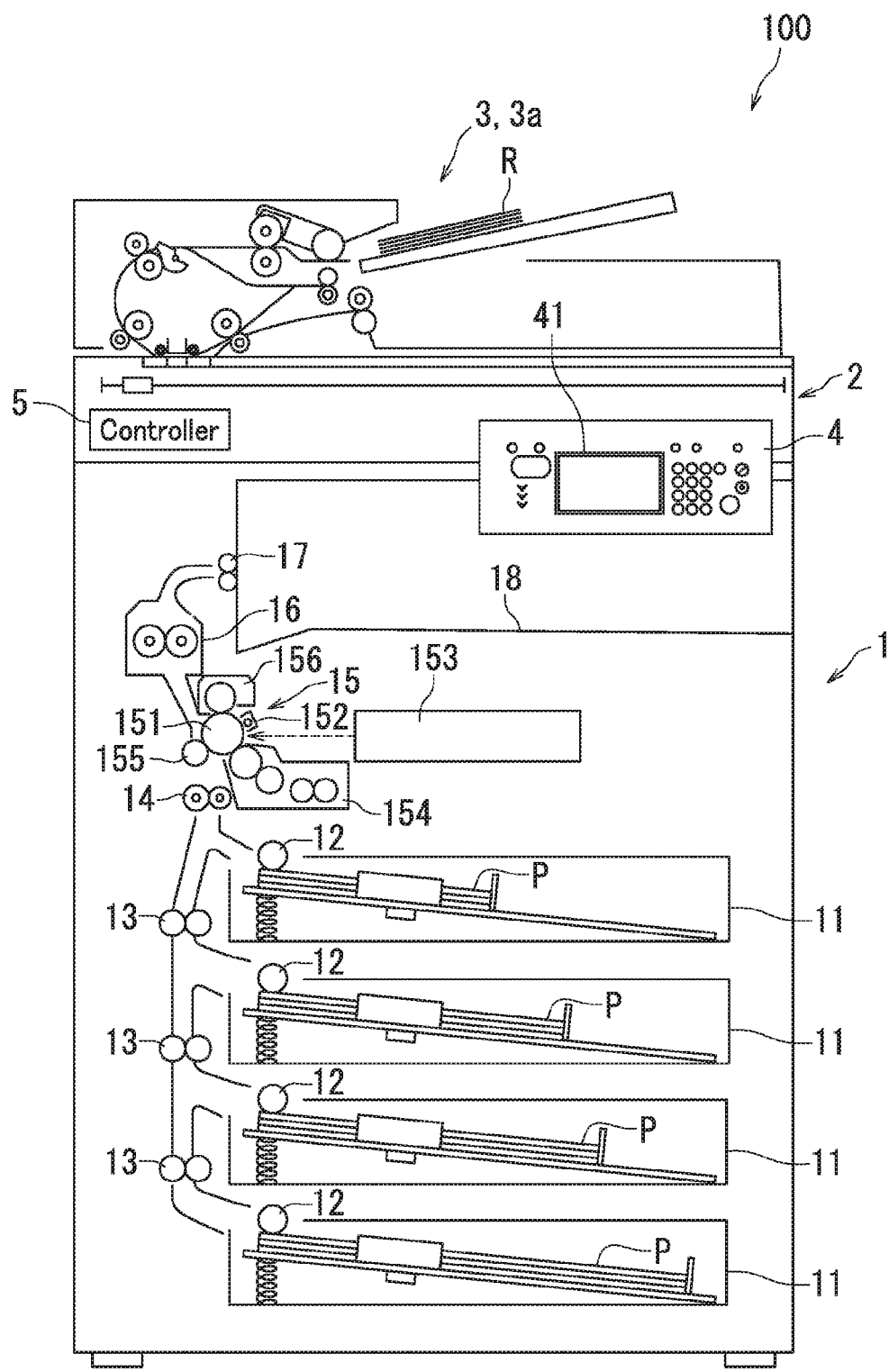
FIG. 1 illustrates a configuration of an image forming apparatus according to an embodiment of the present disclosure.

The following describes embodiments of the present disclosure with reference to the accompanying drawings (FIGS. 1 to 7). Elements in the drawings that are the same or equivalent are marked by the same reference signs, and description of such elements is not repeated.

First, an image forming apparatus 100 according to the present embodiment will be described with reference to FIG. 1. FIG. 1 illustrates a configuration of the image forming apparatus 100 according to the present embodiment. The image forming apparatus 100 according to the present embodiment is a multifunction peripheral (MFP). The image forming apparatus 100 has functions of a scanner, a copier, a printer, and a facsimile machine. The image forming apparatus 100 includes an image forming unit 1, an image reading unit 2, a document conveyance unit 3, an operation panel 4, and a controller 5.

The image forming unit 1 forms an image on paper P, which is an example of the recording medium. The image reading unit 2 reads an image of an original document R. The document conveyance unit 3 conveys the original document R that is a reading target. The operation panel 4 includes a touch panel 41 and receives user operation on the image forming apparatus 100. The controller 5 controls operation of the image forming apparatus 100.

The image forming unit 1 includes paper feed cassettes 11, paper feed rollers 12, conveyance roller pairs 13, a registration roller pair 14, an image forming section 15, a fixing section 16, an ejection roller pair 17, and an exit tray 18. Each of the paper feed rollers 12 picks up paper P from a corresponding one of the paper feed cassettes 11 one sheet at a time. The paper P picked up by the paper feed roller 12 is conveyed to the image forming section 15 by a corresponding one of the conveyance roller pair 13 and the registration roller pair 14.

The image forming section 15 forms an image on the paper P conveyed thereto from the paper feed cassette 11. The image forming section 15 includes a photosensitive drum 151, a charger 152, a light exposure section 153, a development section 154, a transfer roller 155, and a cleaning section 156. The photosensitive drum 151 is a circular tube-shaped rotary member that has a circumferential surface on which an electrostatic latent image is formed. The charger 152 charges the photosensitive drum 151 to a specific electric potential. The light exposure section 153 irradiates the circumferential surface of the photosensitive drum 151 with laser light based on image data. As a result, an electrostatic latent image based on the image data is formed on the circumferential surface of the photosensitive drum 151. The image data is for example image data generated through the image reading unit 2 reading the original document R or image data received from an external computer via a communication network not illustrated. The paper P on which the image has been formed by the image forming section 15 is conveyed to the fixing section 16.

The development section 154 supplies toner to the electrostatic latent image formed on the circumferential surface of the photosensitive drum 151 to develop the electrostatic latent image. Thus, a toner image is formed on the circumferential surface of the photosensitive drum 151. The transfer roller 155 transfers the toner image from the photosensitive drum 151 to the paper P. The cleaning section 156 removes residual toner remaining on the circumferential surface of the photosensitive drum 151 after the transfer.

The fixing section 16 thermally fixes the toner image to the paper P. The fixing section 16 includes a heating roller and a pressure roller. The heating roller has an internal heating element. The heating roller and the pressure roller are pressed against one another to form a fixing nip. The toner adhering to a surface of the paper P is heated and melted as the paper P passes through the fixing nip. As a result, the toner image is fixed to the paper P. The paper P to which the toner image has been fixed is ejected to the exit tray 18 by the ejection roller pair 17.

Figure 2:
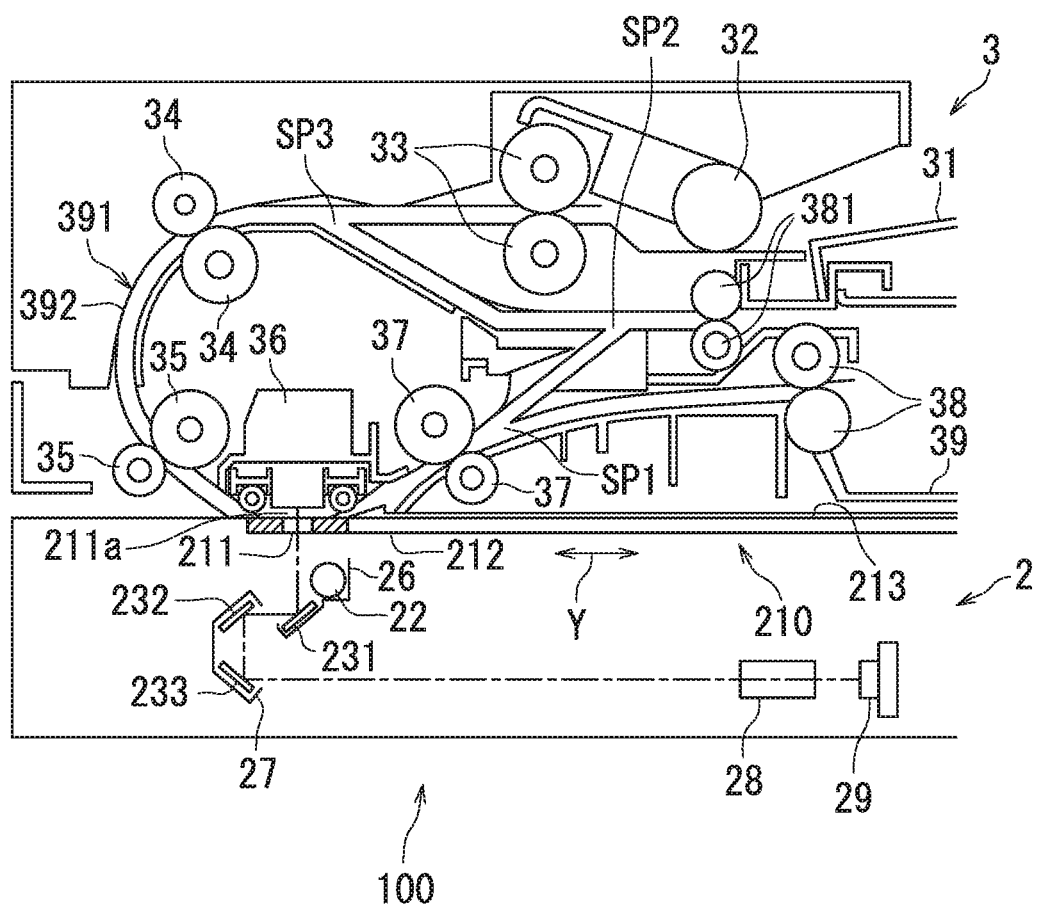
FIG. 2 illustrates configurations of an image reading unit and a document conveyance unit.

Next, the image reading unit 2 and the document conveyance unit 3 will be described with reference to FIG. 2. FIG. 2 illustrates configurations of the image reading unit 2 and the document conveyance unit 3. The image reading unit 2 and the document conveyance unit 3 are equivalent to an example of the "image reading device".

The image reading unit 2 includes contact glass 210, a light emitting diode (LED) 22, a first mirror 231, a second mirror 232, a third mirror 233, a first carriage 26, a second carriage 27, an imaging lens 28, and a charge coupled device (CCD) 29. The LED 22 and the first mirror 231 are supported by the first carriage 26. The second mirror 232 and the third mirror 233 are supported by the second carriage 27. The contact glass 210 have wide document loading glass 212 and narrow automatic document reading glass 211. The automatic document reading glass 211 is located to the left of the document loading glass 212 in FIG. 2.

The image reading unit 2 reads an image of the original document R in a flatbed reading mode or in an automatic document feeder (ADF) reading mode. In the flatbed reading mode, the image reading unit 2 reads the image of the original document R placed on the document loading glass 212. In the ADF reading mode, the image reading unit 2 reads the image of the original document R as the original document R being conveyed by the document conveyance unit 3 passes over a reading position 211a. The following describes an example in which the image reading unit 2 reads an image of an original document R placed on a document tray 31 in the ADF reading mode.

More specifically, in the ADF reading mode, the LED 22 irradiates the original document R with light when the original document R is passing over the reading position 211a. The light reflected off the original document R is reflected off the first mirror 231, the second mirror 232, and the third mirror 233 in the stated order to be incident on the imaging lens 28. The light incident on the imaging lens 28 is imaged on a light-receiving surface of the CCD 29 through photoelectric conversion and output as an image signal. Every time one line of the original document R has been read, the original document R is conveyed by the document conveyance unit 3 and a next line of the original document R is read. This operation is repeated, and thus the image reading unit 2 reads the image of the original document R.

The document conveyance unit 3 includes the document tray 31, a pickup roller 32, a separation roller pair 33, a conveyance roller pair 34, a registration roller pair 35, a reading guide 36, a conveyance roller pair 37, an ejection roller pair 38, a reversing roller pair 381, and a document exit tray 39. The document conveyance unit 3 further includes diverging sections SP1 and SP2, and a junction section SP3. The document conveyance unit 3 forms an ADF. Each roller of the pickup roller 32, the separation roller pair 33, the conveyance roller pair 34, the registration roller pair 35, the conveyance roller pair 37, the reversing roller pair 381, and the ejection roller pair 38 is equivalent to the "conveyance roller".

Hereinafter, the term conveyance roller 30 may be used as a generic term for the rollers of the pickup roller 32, the separation roller pair 33, the conveyance roller pair 34, the registration roller pair 35, the conveyance roller pair 37, the reversing roller pair 381, and the ejection roller pair 38. The conveyance roller 30 is not limited to the pickup roller 32, the separation roller pair 33, the conveyance roller pair 34, the registration roller pair 35, the conveyance roller pair 37, the reversing roller pair 381, and the ejection roller pair 38. For example, the conveyance roller 30 encompasses a non-driven roller disposed along a conveyance path in the document conveyance unit 3.

The document conveyance unit 3 includes conveyance guides 391. The conveyance guides 391 form a conveyance path of the original document R between adjacent conveyance rollers 30. For example, the conveyance guides 391 are disposed at opposite sides of a conveyance path of the original document R between the conveyance roller pair 34 and the registration roller pair 35.

The conveyance guides 391 are for example plate members curved along a conveyance path. The conveyance guides 391 have a plurality of projections 392 formed along a conveyance direction of the original document R in order to reduce sliding resistance between the conveyance guides 391 and the original document R. In such a configuration, the projections 392 are equivalent to the "projection of the conveyance guide".

A plurality of sheets of an original document R (see FIG. 1) are placed on the document tray 31. A bottom of the document tray 31 for example has a lift mechanism that lifts the original document R upward. Upon the original document R being placed on the document tray 31, the lift mechanism lifts the original document R upward so that a topmost sheet of the original document R comes in contact with the pickup roller 32.

The pickup roller 32 that has come in contact with the topmost sheet of the original document R on the document tray 31 is rotationally driven to pick up and convey toward the separation roller pair 33 the original document R one topmost sheet at a time. The pickup roller 32 starts picking up a next sheet of the original document R once a predetermined sheet interval has elapsed after a trailing end of the preceding sheet of the original document R passed.

The separation roller pair 33 conveys the original document R picked up by the pickup roller 32 toward the conveyance roller pair 34 one sheet at a time. The conveyance roller pair 34 conveys the original document R conveyed thereto toward the registration roller pair 35 one sheet at a time. The original document R is conveyed to the conveyance roller pair 34 from the separation roller pair 33 or from the reversing roller pair 381 through the junction section SP3. Two conveyance paths join at the junction section SP3. The two conveyance paths include the conveyance path extending from the separation roller pair 33 toward the conveyance roller pair 34 and the conveyance path extending from the reversing roller pair 381 toward the conveyance roller pair 34. After the original document R is conveyed from the conveyance roller pair 34 to the registration roller pair 35, the registration roller pair 35 conveys the original document R to the reading position 211a at a specific timing.

The reading guide 36 is located downstream of the registration roller pair 35 in the conveyance direction of the original document R. The reading guide 36 is disposed opposite to the contact glass 210 of the image reading unit 2. The reading guide 36 is elongated in a width direction of the original document R (a direction perpendicular to the plane of FIG. 2). The reading guide 36 is for example kept pressed toward the contact glass 210 by coil springs disposed at opposite ends of the reading guide 36 in a longitudinal direction thereof (the direction perpendicular to the plane of FIG. 2). Opposite end portions of a lower surface of the reading guide 36 in the longitudinal direction extend below a central portion thereof. According to the configuration of the present embodiment, the opposite end portions in the longitudinal direction come in contact with a top surface of the contact glass 210 when the document conveyance unit 3 is put in a closed state. Furthermore, according to the configuration of the present embodiment, the original document R passes through a gap formed between the contact glass 210 and the central portion of the lower surface of the reading guide 36 in the longitudinal direction. Thus, during the ADF reading mode, the image formed on the original document R is read as the original document R passes between the reading guide 36 and the automatic document reading glass 211.

The conveyance roller pair 37 is located downstream of the reading position 211a in the conveyance direction of the original document R. The conveyance roller pair 37 conveys the original document R to the ejection roller pair 38 or to the reversing roller pair 381 through the diverging section SP1.

The reversing roller pair 381 is located downstream of the conveyance roller pair 37 in the conveyance direction of the original document R. In double-side image reading in which image reading is performed on both a front side and a rear side of each sheet of the original document R, the conveyance roller pair 37 conveys the original document R to the reversing roller pair 381 through the diverging section SP1 and the diverging section SP2. In single-side image reading in which image reading is performed on one side of each sheet of the original document R, the conveyance roller pair 37 conveys the original document R to the ejection roller pair 38 through the diverging section SP1. In the double-side image reading, the conveyance roller pair 37 conveys each sheet of the original document R to the ejection roller pair 38 after an image of a rear side of the sheet of the original document R has been read at the reading position 211a.

The diverging section SP1 is located downstream of the conveyance roller pair 37 in the conveyance direction of the original document R and allows one conveyance path to diverge into two conveyance paths. The two conveyance paths include the conveyance path extending from the conveyance roller pair 37 toward the ejection roller pair 38 and the conveyance path extending from the conveyance roller pair 37 toward the reversing roller pair 381. The diverging section SP1 includes a diverging guide that operates in accordance with an instruction from the controller 5. The diverging guide switches the conveyance path of the original document R between the two conveyance paths. More specifically, the diverging guide operates to block the conveyance path toward the ejection roller pair 38 or the conveyance path toward the reversing roller pair 381. When the diverging guide operates to block the conveyance path toward the ejection roller pair 38, the original document R is conveyed to the reversing roller pair 381. When the diverging guide operates to block the conveyance path toward the reversing roller pair 381, the original document R is conveyed to the ejection roller pair 38.

After the original document R is conveyed from the conveyance roller pair 37 to the reversing roller pair 381, the reversing roller pair 381 reverses the conveyance direction of the original document R and conveys the original document R to the conveyance roller pair 34. The reversing roller pair 381 reverses sides of each sheet of the original document R by reversing the conveyance direction of the original document R. More specifically, in a situation in which the original document R is conveyed from the conveyance roller pair 37 to the reversing roller pair 381, the original document R is conveyed rightward and upward in FIG. 2. Once a leading end of the original document R has passed through the reversing roller pair 381 and a trailing end of the original document R has passed through the diverging section SP2, the reversing roller pair 381 is stopped. Subsequently, the reversing roller pair 381 starts reverse rotation to convey the original document R to the conveyance roller pair 34 through the diverging section SP2.

The diverging section SP2 is located downstream of the diverging section SP1 in the conveyance direction of the original document R and allows the conveyance path to diverge into two conveyance paths. The two conveyance paths include the conveyance path extending from the conveyance roller pair 37 toward the reversing roller pair 381 and the conveyance path extending from the reversing roller pair 381 toward the conveyance roller pair 34. The diverging section SP2 includes a diverging guide that operates in accordance with an instruction from the controller 5. The diverging guide switches the conveyance path of the original document R between the two conveyance paths. More specifically, the diverging guide operates to block the conveyance path toward the reversing roller pair 381 or the conveyance path toward the conveyance roller pair 34. In order to convey the original document R to the reversing roller pair 381, the diverging guide operates to block the conveyance path toward the conveyance roller pair 34. In order to convey the original document R to the conveyance roller pair 34, the diverging guide operates to block the conveyance path toward the reversing roller pair 381.

After the original document R is conveyed from the conveyance roller pair 37 to the ejection roller pair 38, the ejection roller pair 38 ejects the original document R to the document exit tray 39. The document exit tray 39 has a document loading surface located under the ejection roller pair 38 in part thereof in the vicinity of the ejection roller pair 38 so that ejected sheets of the original document R can be stacked thereon.

The following describes operation of the image reading unit 2 and the document conveyance unit 3 in a situation in which double-side image reading is performed on the original document R.

First, the document conveyance unit 3 conveys a sheet of the original document R to the reading position 211a. More specifically; the pickup roller 32 picks up and conveys toward the separation roller pair 33 a topmost sheet of the original document R. The separation roller pair 33 conveys the sheet of the original document R toward the conveyance roller pair 34. The conveyance roller pair 34 conveys the sheet of the original document R toward the registration roller pair 35. The registration roller pair 35 conveys the sheet of the original document R conveyed thereto to the reading position 211*a* at a specific timing.

The image reading unit 2 reads an image of a front side of the sheet of the original document R at the reading position 211*a*. More specifically, the LED 22 irradiates the sheet of the original document R with light and the light reflected off the sheet of the original document R becomes incident on the CCD 29. The light goes through photoelectric conversion on the light-receiving surface of the CCD 29 to be output as an image signal from the CCD 29. Through the above, image data corresponding to one line of the sheet is read. Next, the registration roller pair 35 moves the sheet of the original document R in a sub-scanning direction (direction indicated by arrow Y) for reading image data corresponding to a next line. An image reading section 51 continuously reads the image of the front side of the sheet of the original document R while the document conveyance unit 3 is moving the sheet of the original document R. Thus, image data is generated. The image reading section 51 then stores the read image data in memory of the controller 5.

Once the image reading on the front side of the sheet of the original document R is complete, the conveyance roller pair 37 conveys the sheet of the original document R to the reversing roller pair 381. The reversing roller pair 381 reverses the conveyance direction of the original document R to convey the sheet of the original document R to the conveyance roller pair 34. The conveyance roller pair 34 conveys the sheet of the original document R toward the registration roller pair 35. The registration roller pair 35 conveys the sheet of the original document R conveyed thereto to the reading position 211*a* at a specific timing. The image reading unit 2 reads an image formed on a rear side of the sheet of the original document R at the reading position 211*a* in the same manner as in image reading on the front side of the sheet of the original document R. The image reading section 51 then stores the read image data in the memory of the controller 5. Subsequently, the conveyance roller pair 37 and the ejection roller pair 38 eject the sheet of the original document R to the document exit tray 39.

Figure 3:
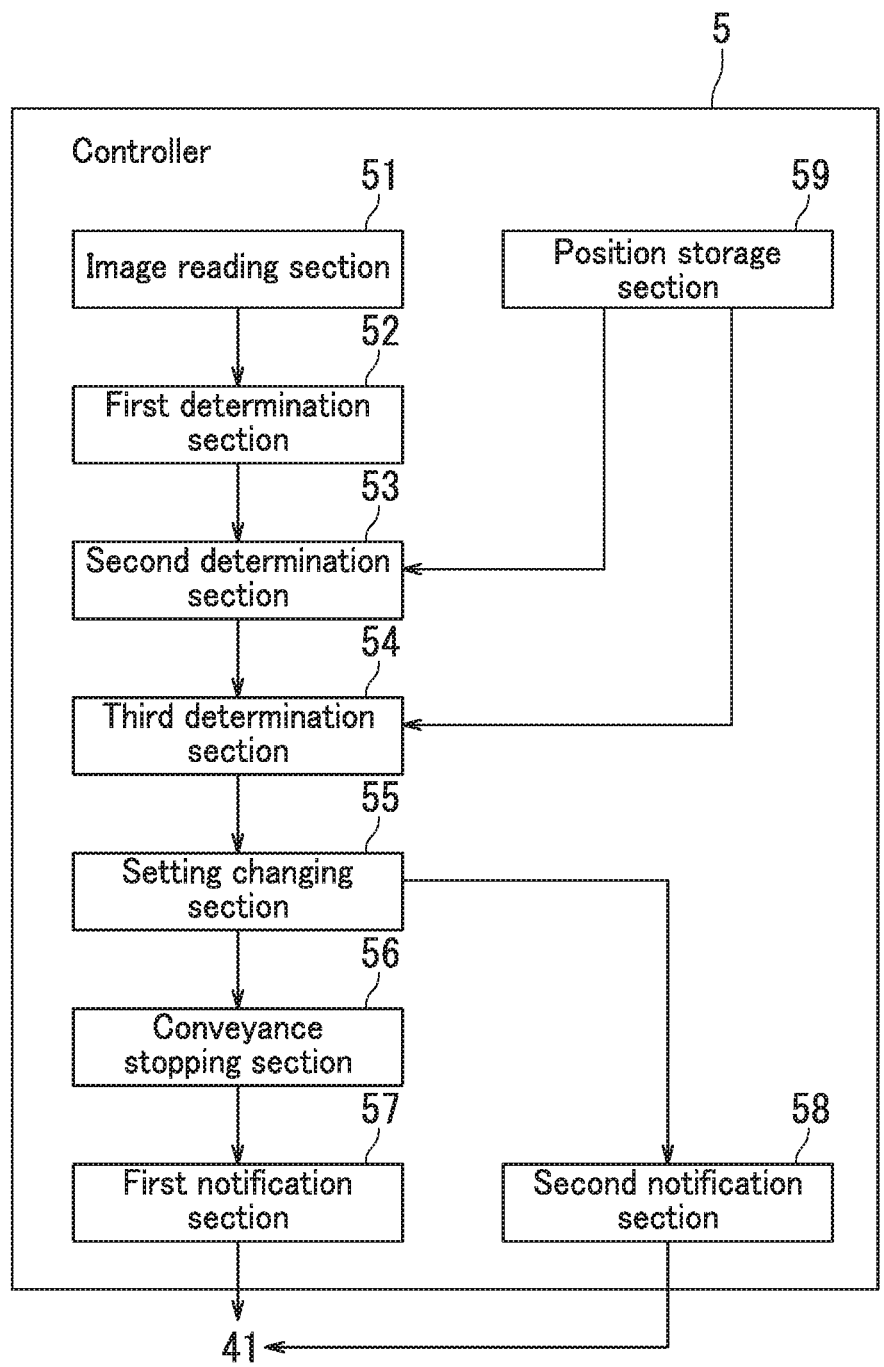
FIG. 3 illustrates a configuration of a controller.
Figure 4A:
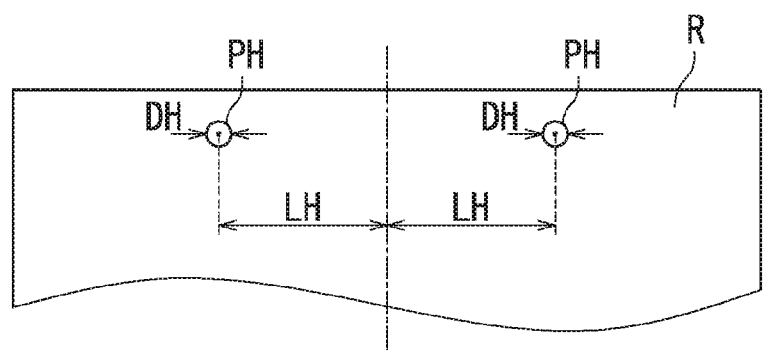
FIGS. 4A and 4B illustrate positional relationship of punched holes and edges of a conveyance roller.
Figure 4B:
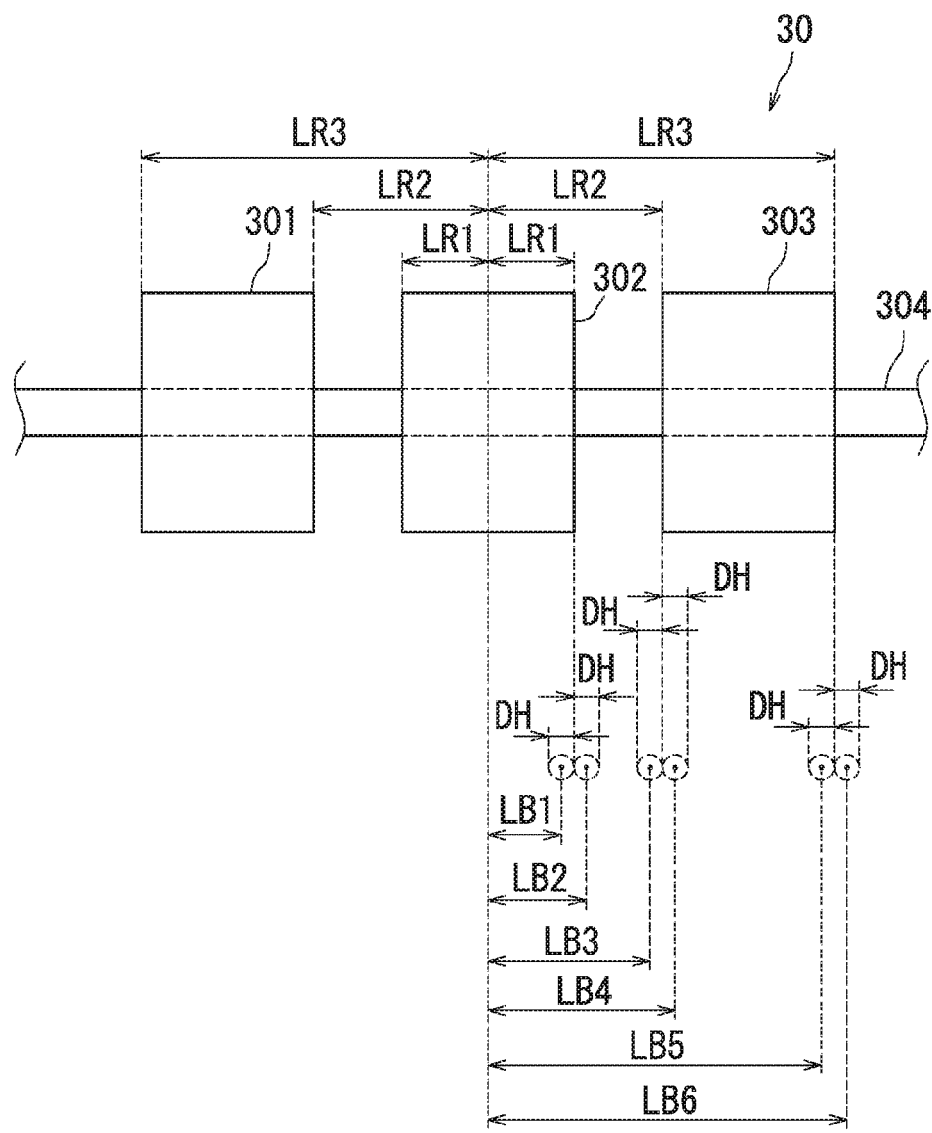

The following describes a configuration of the controller 5 with reference to FIGS. 3, 4A, and 4B. FIG. 3 illustrates the configuration of the controller 5.

The controller 5 includes a central processing unit (CPU) and memory. A control program is stored in the memory. The CPU implements various functional sections through executing the control program. The CPU also causes the memory to implement various functional sections through executing the control program. As a result, the various functional sections implemented by the CPU and the memory control overall operation of the image forming apparatus 100. As illustrated in FIG. 3, the controller 5 includes the image reading section 51, a first determination section 52, a second determination section 53, a third determination section 54, a setting changing section 55, a conveyance stopping section 56, a first notification section 57, a second notification section 58, and a position storage section 59.

The position storage section 59 stores therein positions of edges of the conveyance roller 30 described with reference to FIG. 2.

The following describes what is stored in the position storage section 59 with reference to FIGS. 4A and 4B. FIGS. 4A and 4B illustrate conditions to be satisfied for a punched hole PH to travel on an edge of the conveyance roller 30. FIG. 4A is a plan view of an original document R having punched holes PH. FIG. 4B illustrates conditions to be satisfied for a punched hole PH to travel on an edge of the conveyance roller 30.

As illustrated in FIG. 4A, the original document R has two punched holes PH. The punched holes PH for example have a diameter DH of 6 mm. A distance between centers of the two punched holes PH is for example 80 mm. The punched holes PH are symmetrical to each other with respect to a center line of the original document R. A distance LH from the center of each punched hole PH to the center line is therefore 40 mm. Note that the center line of the original document R is represented by a dashed-dotted line in FIG. 4A.

FIG. 4B is a front view of the conveyance roller 30. The conveyance roller 30 includes narrow rollers 301, 302, and 303, and a central shaft 304. The central shaft 304 is disposed inside the narrow roller 301, the narrow roller 302, and the narrow roller 303. The narrow roller 301, the narrow roller 302, and the narrow roller 303 are fixed to the central shaft 304. In the present embodiment, the edges of the conveyance roller 30 correspond to edges of the narrow roller 301, the narrow roller 302, and the narrow roller 303. Positions of the edges of the conveyance roller 30 in the width direction are positions at distances LR1, LR2, and LR3 from a center line of the conveyance roller 30 in the width direction. The center line of the conveyance roller 30 in the width direction is indicated by a dashed-dotted line in FIG. 4B. The conveyance roller 30 is bilaterally symmetrical with respect to the center line of the conveyance roller 30 in the width direction.

More specifically, the positions of the edges of the narrow roller 302 are each at the distance LR1 from the center line of the conveyance roller 30 in the width direction. The positions of the inner edges of the narrow roller 301 and the narrow rollers 303 in the width direction are each at the distance LR2 from the center line of the conveyance roller 30 in the width direction. The positions of the outer edges of the narrow roller 301 and the narrow roller 303 in the width direction are each at the distance LR3 from the center line of the conveyance roller 30 in the width direction.

The position storage section 59 stores the distance LR1, the distance LR2, and the distance LR3 for the respective rollers included in the conveyance roller 30.

The following describes conditions to be satisfied for a punched hole PH to travel on an edge of the conveyance roller 30. The present embodiment is described for an example in which the center line of the original document R in the width direction (dashed-dotted line in FIG. 4A) matches the center line (dashed-dotted line in FIG. 4B) of the conveyance roller 30 in the width direction. In other words, the present embodiment is described for an example in which the original document R is conveyed such that the center line of the original document R in the width direction matches the center line of the conveyance roller 30 in the width direction and such that opposite edges of the original document R in the width direction are parallel to the conveyance direction of the original document R. As described above, the conveyance roller 30 is bilaterally symmetrical with respect to the center line of the conveyance roller 30 in the width direction. In FIG. 4B, therefore, the conditions to be satisfied for a punched hole PH to travel on an edge of the conveyance roller 30 are illustrated with respect to a right-hand side of the conveyance roller 30 based on the center line thereof in the width direction but are not illustrated with respect to a left-hand side of the conveyance roller 30 based on the center line thereof in the width direction.

The punched holes PH each have a circular shape with the diameter DH. In a situation in which any of the circular shapes with the diameter DH that represent the punched holes PH overlaps an imaginary line defined by an extension of one of the edges of the narrow rollers 301, 302, and 303 in the width direction, the punched hole PH represented by the circular shape travels on the edge of the conveyance roller 30. That is, the punched hole PH travels on the edge of the narrow roller 302 when the following formula (1) is satisfied.

$$LB1 \leq LH \leq LB2 \quad (1)$$

In the formula (1), a distance LB1 is (LR1−DH/2), and a distance LB2 is (LR1+DH/2).

When the following formula (2) is satisfied, the punched hole PH travels on the inner edge of the narrow roller 303 in the width direction.

$$LB3 \leq LH \leq LB4 \quad (2)$$

In the formula (2), a distance LB3 is (LR2−DH/2), and a distance LB4 is (LR2+DH/2). When the following formula (3) is satisfied, the punched hole PH travels on the outer edge of the narrow roller 303 in the width direction.

$$LB5 \leq LH \leq LB6 \quad (3)$$

In the formula (3), a distance LB5 is (LR3−DH/2), and a distance LB6 is (LR3+DH/2).

Referring back to FIG. 3, the configuration of the controller 5 will be described. The image reading section 51 generates image data through the document conveyance unit 3 conveying the original document R and the image reading unit 2 reading images of the original document R. The image reading unit 2 reads images of both sides of each sheet of the original document R as described with reference to FIG. 2.

The first determination section 52 determines whether or not the original document R has any punched holes PH based on the image of the original document R. More specifically, the first determination section 52 determines whether or not the original document R has any punched holes PH as described below. There is no object that reflects light such as paper inside the punched holes PH. Accordingly, the punched holes PH do not reflect light emitted from the LED 22. Images corresponding to the punched holes PH are therefore black circular images. The first determination section 52 determines whether or not the original document R has any punched holes PH based on whether or not the image of the original document R includes any black circular images.

The second determination section 53 determines whether or not any of the punched holes PH is to travel on an edge of the conveyance roller 30. Specifically, upon the first determination section 52 determining that the original document R has punched holes PH, the second determination section 53 determines whether or not any of the punched holes PH is to travel on an edge of the conveyance roller 30. More specifically, as described with reference to FIGS. 4A and 4B, the second determination section 53 determines that one of the punched holes PH is to travel on an edge of the conveyance roller 30 when one of the formulae (1) to (3) is satisfied. The second determination section 53 determines whether or not any of the punched holes PH is to travel on an edge of the conveyance roller 30 with respect to all the rollers included in the conveyance roller 30. The second determination section 53 determines that one of the punched holes PH is to travel on an edge of the conveyance roller 30 when the punched hole PH is determined to travel on an edge of at least one of the rollers included in the conveyance roller 30.

The third determination section 54 determines whether or not any of the punched holes PH is to travel on any of the projections 392 of the conveyance guides 391. More specifically, upon the first determination section 52 determining that the original document R has punched holes PH, the third determination section 54 determines whether or not any of the punched holes PH is to travel on any of the projections 392 of the conveyance guides 391. The third determination section 54 determines whether or not any of the punched holes PH is to travel on any of the projections 392 of the conveyance guides 391 in the same manner as in the determination by the second determination section 53.

The setting changing section 55 changes settings such that image reading is performed on one side of each sheet of the original document R. More specifically, upon the first determination section 52 determining that the original document R has punched holes PH, the setting changing section 55 changes settings such that image reading is performed on one side of each sheet of the original document R. In other words, the setting changing section 55 changes settings for performing double-side image reading on the original document R to settings for performing single-side image reading on the original document R.

The setting changing section 55 changes settings such that image reading is performed on the plurality of sheets of the original document R on a sheet-by-sheet basis. More specifically, upon the first determination section 52 determining that the original document R has punched holes PH, the setting changing section 55 changes settings such that image reading is performed on a plurality of sheets of the original document R on a sheet-by-sheet basis. In other words, the setting changing section 55 changes settings for performing image reading consecutively on a plurality of sheets of the original document R on the document tray 31 to settings for performing image reading on a plurality of sheets of the original document R on a sheet-by-sheet basis.

The conveyance stopping section 56 stops conveyance of the original document R. More specifically, upon the second determination section 53 determining that one of the punched holes PH is to travel on an edge of the conveyance roller 30, the conveyance stopping section 56 stops conveyance of the original document R. Likewise, upon the third determination section 54 determining that one of the punched holes PH is to travel on a projection 392 of the conveyance guides 391, the conveyance stopping section 56 stops conveyance of the original document R.

The first notification section 57 externally notifies that conveyance of the original document R has been stopped. More specifically, the first notification section 57 externally notifies that conveyance of the original document R has been stopped in response to the conveyance stopping section 56 stopping conveyance of the original document R. The first notification section 57 for example notifies that conveyance of the original document R has been stopped via the touch panel 41. The first notification section 57 for example displays the following message on the touch panel 41: "Punched hole will travel on edge of conveyance roller, conveyance of original document has been stopped." In the present embodiment, this message is referred to as "a third message" for convenience. The first notification section 57 is equivalent to the "notification section".

The second notification section 58 externally notifies that settings have been changed such that image reading is performed on one side of each sheet of the original document R. More specifically, the second notification section 58 externally notifies that settings have been changed such that image reading is performed on one side of each sheet of the original document R in response to the setting changing section 55 changing settings for performing double-side image reading to settings for performing single-side image reading. The second notification section 58 for example notifies the setting change via the touch panel 41. The second notification section 58 for example displays the following message on the touch panel 41: "Original document has punched holes, and therefore settings for double-side image reading have been changed to settings for single-side image reading." In the present embodiment, this message is referred to as "a first message" for convenience.

The second notification section 58 externally notifies that settings have been changed such that image reading is performed on a plurality of sheets of the original document R on a sheet-by-sheet basis. More specifically, the second notification section 58 externally notifies that settings have been changed such that image reading is performed on a plurality of sheets of the original document R on a sheet-by-sheet basis in response to the setting changing section 55 changing settings for performing consecutive reading to settings for performing sheet-by-sheet reading. The second notification section 58 for example notifies the setting change via the touch panel 41. The second notification section 58 for example displays the following message on the touch panel 41: "Original document has punched holes, and therefore settings for consecutive reading have been changed to settings for sheet-by-sheet reading." In the present embodiment, this message is referred to as "a second message" for convenience.

Furthermore, the second notification section 58 prompts a user to turn over a sheet of the original document R, place the turned-over sheet on the document tray 31, and perform single-side image reading. More specifically, the second notification section 58 externally notifies that a sheet of the original document R is to be turned over and placed on the document tray 31, and single-side image reading is to be performed in response to the setting changing section 55 changing settings for performing double-side image reading to settings for performing single-side image reading. The second notification section 58 for example notifies the prompt via the touch panel 41. The second notification section 58 for example displays the following guidance on the touch panel 41: "Turn over and place sheet of original document on document tray, then perform single-side image reading."

Figure 5:
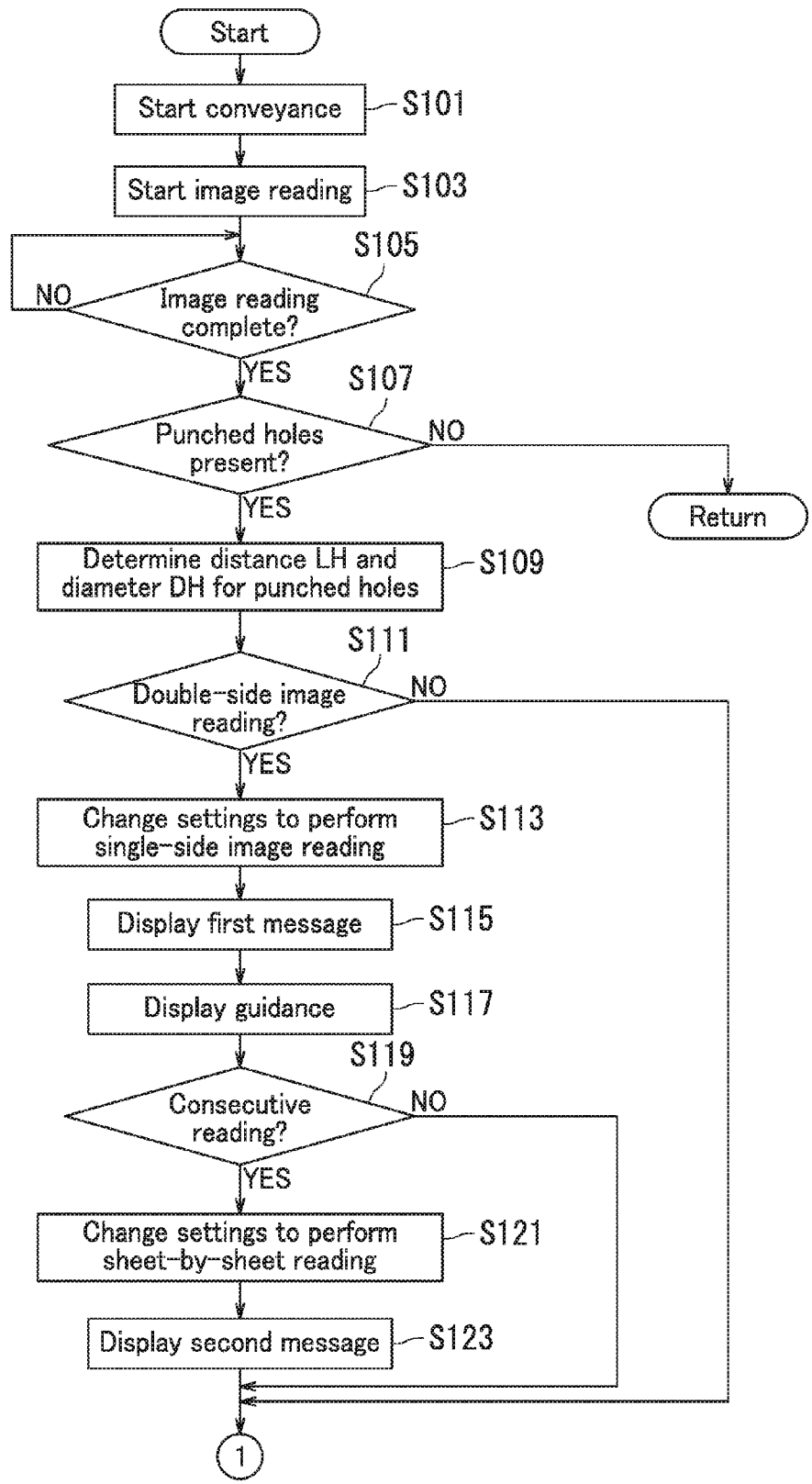
FIG. 5 is a flowchart illustrating operation of the controller.
Figure 6:
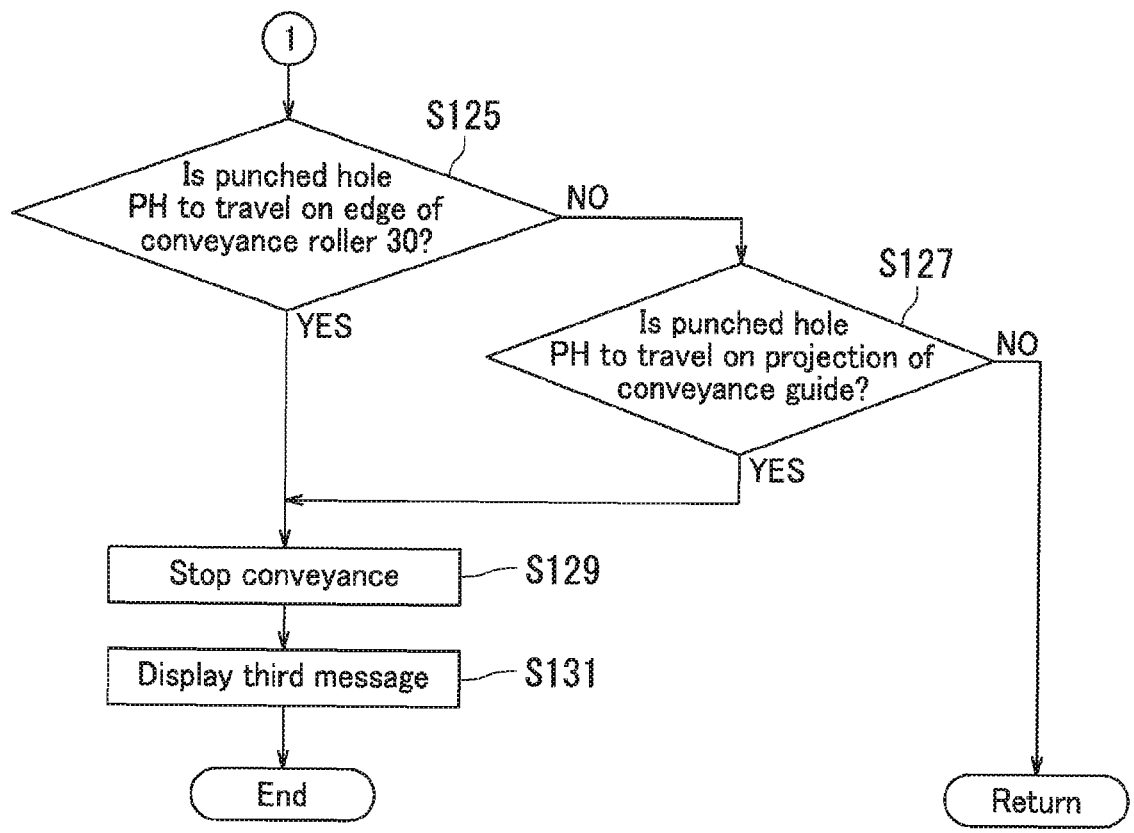
FIG. 6 is a flowchart illustrating operation of the controller.

The following describes operation of the controller 5 with reference to FIGS. 5 and 6. FIGS. 5 and 6 are a flowchart illustrating operation of the controller 5. First, the image reading section 51 starts conveyance of a sheet of the original document R placed on the document tray 31 (Step S101). Subsequently, the image reading section 51 starts reading an image of a front side of the sheet of the original document R (Step S103). More specifically, the image reading section 51 reads the image of the front side of the sheet of the original document at the reading position 211a using the image reading unit 2.

Next, the image reading section 51 determines whether or not reading of the image of the front side of the sheet of the original document R is complete (Step S105). Upon determination that image reading is not complete (No in Step S105), the process is put in a standby state. Upon determination that image reading is complete (Yes in Step S105), the process proceeds to Step S107. Subsequently, the first determination section 52 determines whether or not the original document R has punched holes PH (Step S107). More specifically, the first determination section 52 determines whether or not the original document R has punched holes PH based on image data of the front side of the sheet of the original document that is obtained in Step S105.

Upon determination that the original document R has no punched holes PH (No in step S107), the process returns to Step S101. Upon determination that the original document R has punched holes PH (Yes in Step S107), the process proceeds to Step S109. The second determination section 53 determines the distance LH and the diameter DH for the punched holes PH (Step S109). The distance LH is a distance from the center line of the original document R in the width direction to the center of each punched hole PH. Next, the setting changing section 55 determines whether or not the current settings are for performing double-side image reading on the original document R (Step S111). Upon determination that the current settings are not for performing double-side image reading on the original document R (No in Step S111), the process proceeds to Step S125 shown in FIG. 6. Upon determination that the current settings are for performing double-side image reading on the original document R (Yes in Step S111), the process proceeds to Step S113.

Subsequently, the setting changing section 55 changes the current settings to settings for performing single-side image reading on the original document R (Step S113). Next, the second notification section 58 displays the first message on the touch panel 41 (Step S115). The first message indicates that the current settings have been changed to settings for performing single-side image reading on the original document R. Next, the second notification section 58 displays the guidance on the touch panel 41 (Step S117). The guidance indicates that the sheet of the original document R is to be turned over and placed on the document tray 31, and single-side image reading is to be performed.

Next, the setting changing section 55 determines whether or not the current settings are for consecutively reading a plurality of sheets of the original document R on the document tray 31 (Step S119). Upon determination that the current settings are not for consecutively reading a plurality of sheets of the original document R (No in Step S119), the process proceeds to Step S125 shown in FIG. 6. Upon determination that the current settings are for consecutively reading a plurality of sheets of the original document R (Yes in Step S119), the process proceeds to Step S121. Subsequently, the setting changing section 55 changes the current settings to settings for reading images of a plurality of sheets of the original document R on a sheet-by-sheet basis (Step S121). Next, the second notification section 58 displays the second message on the touch panel 41 (Step S123). The second message indicates that the current settings have been changed to settings for reading images of a plurality of sheets of the original document R on a sheet-by-sheet basis.

Upon completion of the process in Step S123, or when a result of the determination in Step S111 is negative (No), or when a result of the determination in Step S119 is negative (No), the process proceeds to Step S125 shown in FIG. 6. Subsequently, the second determination section 53 determines whether or not any of the punched holes PH is to travel on an edge of the conveyance roller 30 (Step S125). Upon determination that one of the punched holes PH is to travel on an edge of the conveyance roller 30 (Yes in Step S125), the process proceeds to Step S129. Upon determination that neither of the punched holes PH is to travel on an edge of the conveyance roller 30 (No in Step S125), the process proceeds to Step S127. Subsequently, the third determination section 54 determines whether or not any of the punched holes PH is to travel on any of the projections 392 of the conveyance guides 391 (Step S127).

Upon determination that neither of the punched holes PH is to travel on any of the projections 392 of the conveyance guides 391 (No in Step S127), the process returns to Step S101 shown in FIG. 5. Upon determination that one of the punched holes PH is to travel on one of the projections 392 of the conveyance guides 391 (Yes in Step S127), the process proceeds to Step S129.

When a result of the determination in Step S125 is positive (Yes) or when a result of the determination in Step S127 is positive (Yes), the conveyance stopping section 56 stops conveyance of the original document R (Step S129). Subsequently, the first notification section 57 displays the third message on the touch panel 41 (Step S131). The third message indicates that the punched hole PH is to travel on an edge of the conveyance roller 30, and therefore conveyance of the original document R has been stopped. Upon completion of Step S131, the process comes to an end.

As described with reference to FIGS. 3 to 6, the first determination section 52 determines whether or not the original document R has any punched holes PH based on the image of the original document R. Upon determination that the original document R has punched holes PH, the second determination section 53 determines whether or not any of the punched holes PH is to travel on an edge of the conveyance roller 30. Upon determination that one of the punched holes PH is to travel on an edge of the conveyance roller 30, the conveyance stopping section 56 stops conveyance of the original document R. Thus, the punched hole PH in the original document R can be prevented from traveling on an edge of the conveyance roller 30. If the punched hole PH in the original document R travels on an edge of the conveyance roller 30, a periphery of the punched hole PH may be damaged. Since the punched hole PH in the original document R can be prevented from traveling on an edge of the conveyance roller 30, the periphery of the punched hole PH can be prevented from being damaged.

Upon determination that the original document R has punched holes PH, the third determination section 54 determines whether or not any of the punched holes PH is to travel on any of the projections 392 of the conveyance guides 391. Upon determination that one of the punched holes PH is to travel on one of the projections 392 of the conveyance guides 391, the conveyance stopping section 56 stops conveyance of the original document R. Thus, the punched hole PH in the original document R can be prevented from traveling on the projection 392 of the conveyance guides 391. If the punched hole PH in the original document R travels on the projection 392 of the conveyance guides 391, a periphery of the punched hole PH may be damaged. Since the punched hole PH in the original document R can be prevented from traveling on the projection 392 of the conveyance guides 391, the periphery of the punched hole PH can be prevented from being damaged.

Furthermore, upon the conveyance stopping section 56 stopping conveyance of the original document R, the first notification section 57 externally notifies that the original document R has punched holes PH, and therefore conveyance of the original document R has been stopped. A user can therefore know why the conveyance has been stopped. Thus, usability can be improved.

In a situation in which double-side image reading is performed on the original document R, the reversing roller pair 381 reverses sides of each sheet of the original document R after an image of a front side of the sheet of the original document R has been read. If a sheet of the original document R having punched holes PH is reversed, peripheries of the punched holes PH may be damaged. Furthermore, because of the punched holes PH, the sheet of the original document R may result in a jam upon being reversed. According to the present embodiment, however, upon determination that the original document R has punched holes PH, the setting changing section 55 changes settings for performing double-side image reading on the original document R to settings for performing single-side image reading on the original document R. Accordingly, the sheet of the original document R is not reversed, and thus peripheries of the punched holes PH can be prevented from being damaged. Furthermore, since the sheet of the original document R is not reversed, occurrence of a jam can be reduced.

In a situation in which double-side image reading is performed on the original document R, an image of a front side of a sheet of the original document R is read, and subsequently an image of a rear side of the sheet of the original document R is read. Upon determination that the original document R has punched holes PH, the setting changing section 55 changes the current settings to settings for performing single-side image reading on the original document R. If image reading is performed consecutively on a plurality of sheets of the original document R, therefore, images of front sides of the sheets of the original document R are consecutively read. Consequently, images of both sides of the respective sheets of the original document R cannot be read in the correct order. According to the present embodiment, however, upon the first determination section 52 determining that the original document R has punched holes PH, the setting changing section 55 changes settings such that image reading is performed on a plurality of sheets of the original document R on a sheet-by-sheet basis. Thus, after an image of a front side of a sheet of the original document R has been read, a user can be prompted to turn over the sheet, place the turned-over sheet on the document tray 31, and perform image reading on a rear side of the sheet. Consequently, images of both sides of the respective sheets of the original document R can be read in the correct order.

Figure 7:
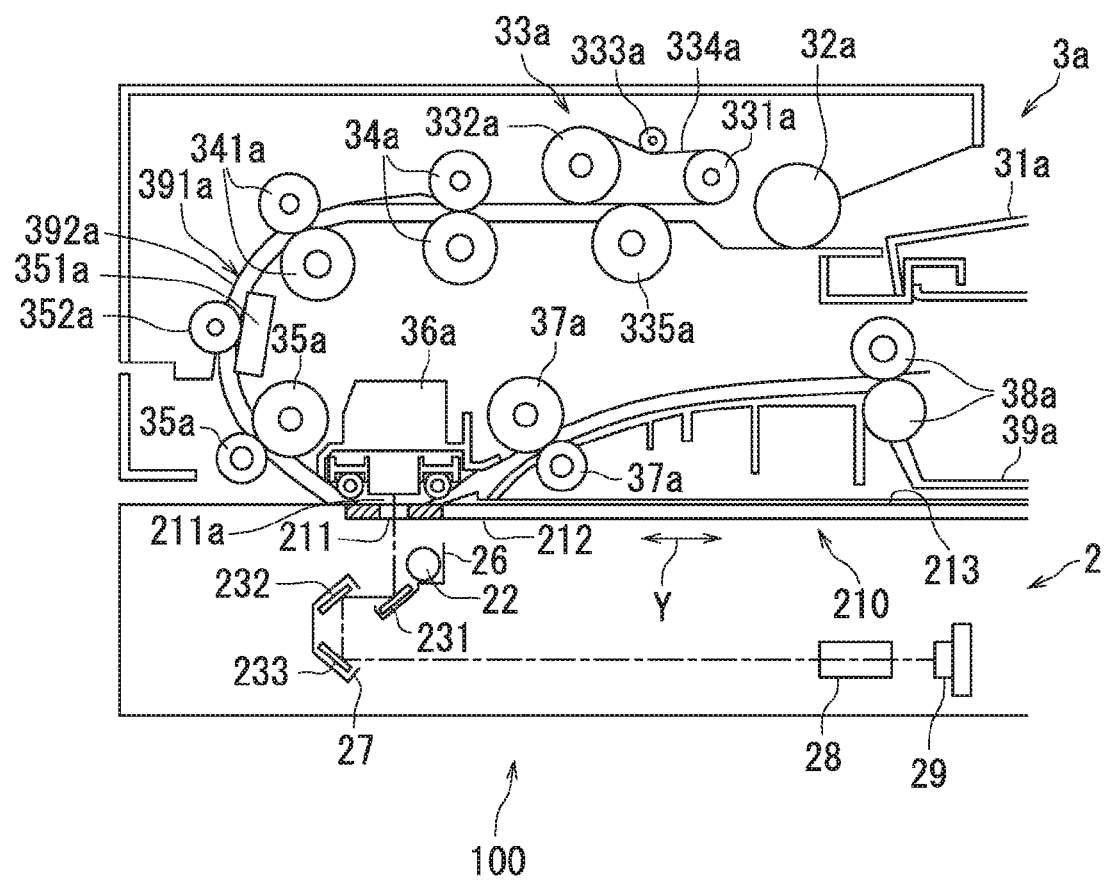
FIG. 7 illustrates a document conveyance unit according to another embodiment.

The following describes the document conveyance unit 3 according to another embodiment with reference to FIG. 7. FIG. 7 illustrates the document conveyance unit 3 according to another embodiment (a document conveyance unit 3a). The document conveyance unit 3a is different from the document conveyance unit 3 mainly in that the document conveyance unit 3a includes an image reading section 351a for reading an image of a rear side of each sheet of the original document R. Since the document conveyance unit 3a includes the image reading section 351a, it is possible to read images of both sides of each sheet of the original document R without reversing the original document R. That is, the image reading unit 2 reads an image of a front side of a sheet of the original document R and the image reading section 351a reads an image of a rear side of the sheet of the original document R. The following mainly describes differences between the configuration of the document conveyance unit 3a and the configuration of the document conveyance unit 3.

The document conveyance unit 3a includes a document tray 31a, a pickup roller 32a, a sheet feed section 33a, a conveyance roller pair 34a, a registration roller pair 341a, the image reading section 351a, a white reference roller 352a, a conveyance roller pair 35a, a reading guide 36a, a conveyance roller pair 37a, an ejection roller pair 38a, and a document exit tray 39a.

The sheet feed section 33a is located downstream of the pickup roller 32a in the conveyance direction of the original document R. The sheet feed section 33a includes a driven roller 331a, a drive roller 332a, a tension adjusting roller 333a, a sheet feed belt 334a, and a separation roller 335a. The sheet feed belt 334a is stretched around the drive roller 332a and the driven roller 331a. The drive roller 332a drives the sheet feed belt 334a. The driven roller 331a is rotationally driven with rotation of the sheet feed belt 334a. The tension adjusting roller 333a adjusts tension of the sheet feed belt 334a.

The sheet feed belt 334a and the separation roller 335a form a sheet feed nip therebetween. The sheet feed belt 334a is driven by the drive roller 332a and thus conveys the original document R that has come in the sheet feed nip toward the conveyance roller pair 34a. The separation roller 335a is rotationally driven so as to convey the original document R in a direction opposite to the conveyance direction of the original document R. Therefore, even if a plurality of sheets of the original document R stacked on one another are pulled out from the document tray 31a at a time, the separation roller 335a separates the stack of sheets of the original document R from one another.

After the original document R is conveyed from the conveyance roller pair 34a to the registration roller pair 341a, the registration roller pair 341a conveys the original document R to the image reading section 351a at a specific timing. The image reading section 351a is a contact image sensor (CIS) unit including an LED, contact glass, an imaging lens, and an image sensor that are unitized. The image reading section 351a reads an image of a rear side of each sheet of the original document R conveyed thereto from the registration roller pair 341a.

The white reference roller 352a is disposed opposite to the image reading section 351a. The white reference roller 352a has a white outer circumferential surface for acquiring white reference data to be used in shading correction. The white reference data to be used in shading correction is generated by the image sensor of the image reading section 351a as described below. That is, the LED of the image reading section 351a emits light to the outer circumferential surface of the white reference roller 352a with no original document R at the image reading section 351a. The image sensor of the image reading section 351a then receives the light reflected off the white reference roller 352a and generates white reference data.

The following describes operation of the document conveyance unit 3a. The pickup roller 32a picks up and conveys toward the sheet feed section 33a the original document R on the document tray 31a one topmost sheet at a time. The sheet feed section 33a conveys the original document R toward the conveyance roller pair 34a one sheet at a time. The conveyance roller pair 34a conveys each sheet of the original document R toward the registration roller pair 341a. The registration roller pair 341a conveys the sheet of the original document R to the image reading section 351a at a specific timing. The image reading section 351a reads an image of a rear side of the sheet of the original document R. After the sheet of the original document R is conveyed from the registration roller pair 341a to the conveyance roller pair 35a, the conveyance roller pair 35a conveys the sheet of the original document R to the reading position 211a. The image reading unit 2 reads an image of a front side of the sheet of the original document R at the reading position 211a. After the sheet of the original document R is conveyed from the conveyance roller pair 35a to the conveyance roller pair 37a via the reading position 211a, the conveyance roller pair 37a conveys the sheet of the original document R to the ejection roller pair 38a. The ejection roller pair 38a ejects the sheet of the original document R to the document exit tray 39a.

In the document conveyance unit 3a, each roller of the pickup roller 32a, the separation roller 335a, the conveyance roller pair 34a, the registration roller pair 341a, the conveyance roller pair 35a, the conveyance roller pair 37a, and the ejection roller pair 38a is equivalent to the "conveyance roller". The "conveyance roller" encompasses a non-driven roller disposed along a conveyance path in the document conveyance unit 3a. The document conveyance unit 3a includes conveyance guides 391a. The conveyance guides 391a have the same configuration as the conveyance guides 391 described with reference to FIG. 2.

In a configuration in which the document conveyance unit 3a is used instead of the document conveyance unit 3, the setting changing section 55 is not necessary. In other words, even if the first determination section 52 determines that the original document R has punched holes PH, it is not necessary to change settings such that image reading is performed on one side of each sheet of the original document R. That is, settings for performing double-side image reading on the original document R may be kept unchanged. The reason for the above is that the image reading section 351a and the image reading unit 2 read images of both sides of each sheet of the original document R during conveyance of the sheet from the document tray 31a to the document exit tray 39a without reversing the original document R.

Furthermore, even if the first determination section 52 determines that the original document R has punched holes PH, it is not necessary to change settings such that image reading is performed on a plurality of sheets of the original document R on a sheet-by-sheet basis. That is, settings for performing image reading consecutively on a plurality of sheets of the original document R may be kept unchanged. The reason for the above is that the image reading section 351a and the image reading unit 2 read images of both sides of each sheet of the original document R during conveyance the sheet from the document tray 31a to the document exit tray 39a without reversing the original document R.

Through the above, embodiments of the present disclosure have been described with reference to the drawings. However, the present disclosure is not limited to the above embodiments and may be implemented in various different forms that do not deviate from the essence of the present disclosure (for example, as described below in sections (1)-(6)). The drawings schematically illustrate elements of configuration in order to facilitate understanding. Properties of elements of configuration illustrated in the drawings, such as thickness, length, and number thereof, may differ from actual properties thereof in order to facilitate preparation of the drawings. Furthermore, properties of elements of configuration described in the above embodiments, such as shapes and dimensions, are merely examples and are not intended as specific limitations. Various alterations may be made so long as there is no substantial deviation from the configuration of the present disclosure.

(1) As described with reference to FIG. 3, the first determination section 52 determines whether or not the original document R has punched holes PH based on whether or not the image of the original document R includes any black circular images. However, the present disclosure is not limited to such an embodiment. For example, the first determination section 52 may determine whether or not the original document R has punched holes PH by performing image processing on an image of the original document R. The image processing is for example edge emphasizing processing.

(2) The present disclosure has been described with reference to FIGS. 4A and 4B for embodiments in which holes are punched holes PH. However, the present disclosure is not limited to such embodiments. The holes may be any holes so long as the holes are formed in the original document R. For example, the holes may be those formed as a result of damage on the original document R.

(3) The present disclosure has been described with reference to FIGS. 4A and 4B for embodiments in which the original document R has two punched holes PH. However, the present disclosure is not limited to such embodiments. The original document R may have three or more punched holes PH.

(4) The present disclosure has been described with reference to FIGS. 4A and 4B for embodiments in which the original document R is conveyed at a central region of the conveyance roller 30 in the document conveyance unit 3 in a front-rear direction (direction perpendicular to the plane of FIG. 2) and the original document R is conveyed such that opposite edges of each sheet of the original document R in the width direction are parallel to the conveyance direction. However, the present disclosure is not limited to such embodiments. The original document R may be conveyed at a region offset from the central region of the conveyance roller 30 in the document conveyance unit 3 in the front-rear direction (direction perpendicular to the plane of FIG. 2). The original document R may be conveyed such that the opposite edges of each sheet of the original document R in the width direction are oblique (i.e., skew) to the conveyance direction. In such situations, preferably, whether or not any of the punched holes PH is to travel on any of the projections 392 of the conveyance guides 391 is determined by appropriately modifying the formulae (1) to (3) described with reference to FIGS. 4A and 4B.

(5) The present disclosure has been described with reference to FIGS. 4A and 4B for embodiments in which the conveyance roller 30 includes the three narrow rollers 301 to 303. However, the present disclosure is not limited to such embodiments. The conveyance roller 30 may include two narrow rollers or may include four or more narrow rollers.

(6) The present disclosure has been described with reference to FIG. 3 for embodiments in which the conveyance guides 391 have the plurality of projections 392. However, the present disclosure is not limited to such embodiments. Narrow rollers may be disposed on the conveyance guides 391. In such a configuration, the narrow rollers are encompassed by the conveyance roller 30. That is, the second determination section 53 determines whether or not any of the punched holes PH is to travel on an edge of any of the narrow rollers.

What is claimed is:

1. An image reading device for reading an image of an original document, comprising:
   a plurality of conveyance rollers configured to convey the original document;
   an image reading section configured to read the image of the original document;
   a first determination section configured to determine whether or not the original document has a hole based on the image read by the image reading section;
   a second determination section configured to determine, upon determination that the original document has the hole, whether or not the hole is to travel on an edge of any of the conveyance rollers;
   a conveyance stopping section configured to stop conveyance of the original document upon determination that the hole is to travel on the edge of the conveyance roller; and
   a position storage section configured to store therein positions of edges of each of the conveyance rollers in a width direction of the original document, wherein
   the second determination section determines whether or not the hole is to travel on an edge of any of the conveyance rollers based on the positions of the edges in the width direction.

2. The image reading device according to claim 1, further comprising:
   a conveyance guide configured to guide conveyance of the original document, the conveyance guide having a projection; and
   a third determination section configured to determine, upon determination that the original document has the hole, whether or not the hole is to travel on the projection of the conveyance guide, wherein
   the conveyance stopping section stops conveyance of the original document upon determination that the hole is to travel on the projection of the conveyance guide.

3. The image reading device according to claim 2, wherein
   the conveyance guide has a plurality of the projections, and
   the second determination section determines whether or not the hole is to travel on at least one of the projections.

4. The image reading device according to claim 1, further comprising
   a notification section configured to externally notify that the original document has the hole, and therefore conveyance of the original document has been stopped, in response to the conveyance stopping section stopping conveyance of the original document.

5. The image reading device according to claim 1, wherein
   the original document includes a sheet whose opposite sides have images formed thereon,
   the image reading section is preset to perform image reading on both the sides of the sheet of the original document, and
   the image reading device further comprises a setting changing section configured to change, upon determination that the original document has the hole, settings such that image reading is performed on one of the sides of the sheet of the original document.

6. The image reading device according to claim 5, wherein
   the original document includes a plurality of the sheets,
   the image reading section is preset to perform image reading consecutively on the sheets of the original document, and
   the setting changing section changes, upon determination that the original document has the hole, settings such that image reading is performed on the sheets of the original document on a sheet-by-sheet basis.

7. The image reading device according to claim 5, further comprising
   a notification section configured to externally notify that the settings have been changed such that image reading is performed on one of the sides of the sheet of the original document upon the setting changing section changing the settings such that image reading is performed on one of the sides of the sheet of the original document.

8. The image reading device according to claim 1, wherein the hole is a punched hole, and the first determination section determines whether or not the original document has the punched hole based on whether or not the image of the original document includes a black circular image.

9. The image reading device according to claim 1, wherein each of the conveyance rollers includes a plurality of narrow rollers, and the second determination section determines whether or not the hole is to travel on an edge of at least one of the narrow rollers.

10. An image forming apparatus comprising:

an image forming section configured to form an image on a recording medium; and the image reading device according to claim 1.

11. The image reading device according to claim 1, wherein the hole is a punched hole, the second determination section determines a diameter of the hole and a distance from a center line of the original document in the width direction to a center of the hole, and the second determination section determines whether or not the hole is to travel on an edge of any of the conveyance rollers based on the diameter and the distance.

12. An image reading device for reading an image of an original document, comprising:

a conveyance roller configured to convey the original document;

an image reading section configured to read the image of the original document;

a first determination section configured to determine whether or not the original document has a hole based on the image read by the image reading section;

a second determination section configured to determine, upon determination that the original document has the hole, whether or not the hole is to travel on an edge of the conveyance roller;

a conveyance stopping section configured to stop conveyance of the original document upon determination that the hole is to travel on the edge of the conveyance roller;

a setting changing section; and a notification section, wherein the original document includes one or more sheets each having images formed on opposite sides thereof, the image reading section is preset to perform image reading on both the sides of each sheet of the original document, and the setting changing section changes, upon determination that the original document has the hole, settings such that image reading is performed on one of the sides of each sheet of the original document, the image reading section is preset to perform image reading consecutively on the sheets of the original document, the setting changing section changes, upon determination that the original document has the hole, settings such that image reading is performed on the sheets of the original document on a sheet-by-sheet basis, and the notification section externally notifies that the settings have been changed such that image reading is performed on the sheets of the original document on a sheet-by-sheet basis upon the setting changing section changing the settings such that image reading is performed on the sheets of the original document on a sheet-by-sheet basis.

\* \* \* \* \*